Sept. 22, 1925.
E. ENGLEN
1,554,427
NONGLARING AUTOMOBILE HEADLIGHT
Filed Sept. 18, 1924
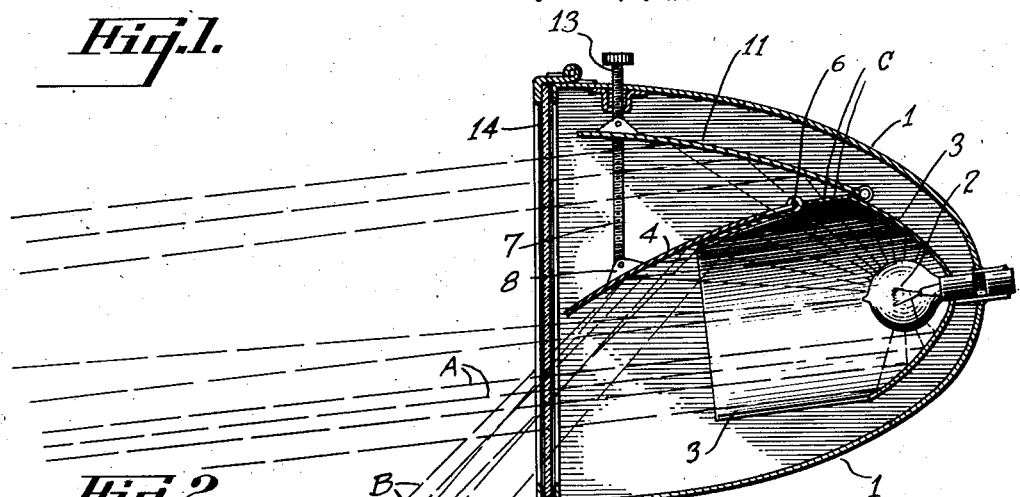
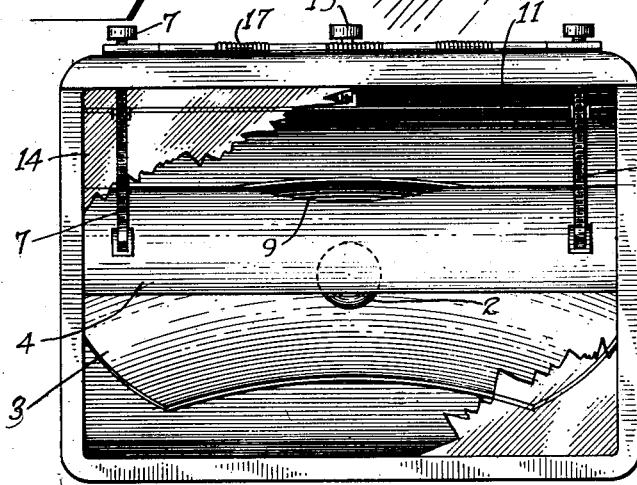
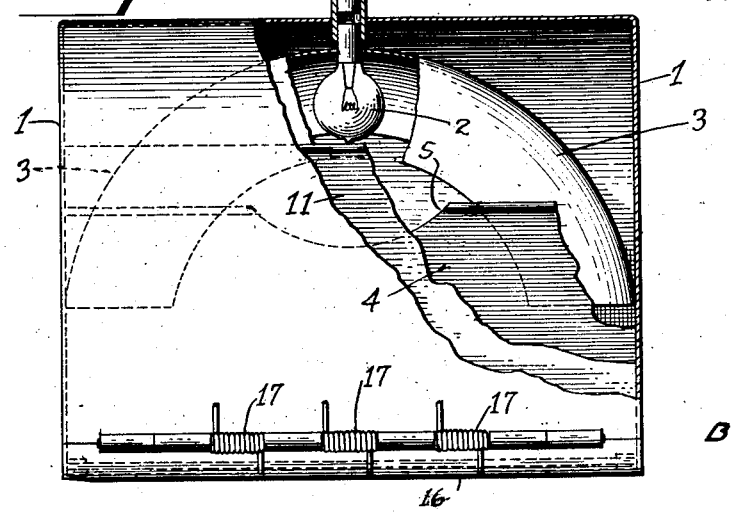
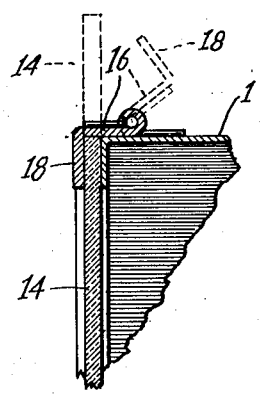
INVENTOR
ERIC ENGLEN
BY Arthur L. Slee
ATTY.

Patented Sept. 22, 1925.

1,554,427

UNITED STATES PATENT OFFICE.

ERIC ENGLEN, OF SAN FRANCISCO, CALIFORNIA.

NONGLARING AUTOMOBILE HEADLIGHT.

Application filed September 18, 1924. Serial No. 738,435.

*To all whom it may concern:*

Be it known that I, ERIC ENGLEN, a citizen of the Dominion of Canada, residing in the city and county of San Francisco and State of California, have invented a new and useful Improvement in a Nonglaring Automobile Headlight, of which the following is a specification.

My invention relates to improvements in automobile headlights and the like wherein a pair of vertically spaced and independently adjustable reflectors cooperate with a light condensing reflector to project light downwardly in a plurality of portions at different angles to illuminate the ground in zones at various distances in front of the headlight and to prevent the projection of light blinding to persons in front of the headlight.

The primary object of my invention is to provide an improved headlight for automobiles and the like.

Another object of my invention is to provide a light which will afford an efficient lighting of a road and which will direct the light in a manner adapted to prevent glaring.

A further object is to provide an improved headlight which will effectively illuminate the sides of the road as well as the roadway immediately in front of an automobile.

Another object is to provide a combination and arrangement of reflectors which will divide the rays from a lighting element into a plurality of portions adapted to illuminate the road in zones at various distances in front of the headlight whereby the light may be apportioned to the particular requirement for safe driving.

A still further object is to provide a structure which may be easily and efficiently adjusted to obtain a desired distribution of light.

I accomplish these and other objects by means of the improved device disclosed in the drawings forming a part of the present specification and drawings wherein like characters of reference are used to designate similar parts throughout said specification and drawings and in which, Fig. 1 is a vertical section of my improved headlight showing the manner in which the light rays are divided and projected from the headlight.

Fig. 2 is a broken front elevation of the headlight.

Fig. 3 is a broken plan view partly in section, parts being partially broken away to disclose the form and arrangement of parts.

Fig. 4 is a broken sectional detail showing the manner in which the transparent front of the headlight may be removed to obtain access to the interior of the headlight.

Referring to the drawings the numeral 1 is used to designate in general a headlight housing within the back of which is mounted a lighting element 2 connected in any suitable manner to a source of electrical energy not shown.

An arcuate reflector 3, substantially parabolic in cross section is mounted in back of the lighting element 2, said reflector 3 being adapted to concentrate the rays from the light rays from the lighting element into a fan shaped beam A and project rays forwardly through the front of the housing 1. The reflector, or light condensing element as it will hereinafter be referred to to distinguish from other reflecting elements hereinafter described, is preferably arranged at a slight angle so that the fan shaped beam will be directed slightly downwardly at an angle adapted to cause the beam to normally strike the ground at a distance of about fifty feet in advance of the headlight whereby a zone of relatively high illumination will occur at this point.

A reflector 4 is mounted within the forward portion of the housing immediately over and in front of the light condensing element 3, said reflector extending substantially across the housing and being inclined at an angle adapted to cause the rays constituting the upper half of the beam A to be intercepted and reflected downwardly onto the ground immediately in front of the headlight as indicated by the rays B. The reflector 4 is pivotally mounted as at 6 and adjusting screws 7 extend downwardly from the top of the housing into pivotal engagement with lugs 8 formed upon the top of the reflector whereby the inclination of the reflector may be adjusted and the portion of the beam A and the angle of deflection regulated to afford a desired division of the light. The reflector is preferably made with a very slight curvature to increase the effectiveness with which the light is thrown onto the ground. A recess 9 is formed in the rearward edge of the reflector 4 above the lighting element 2 to admit light rays C upwardly therepast for a purpose hereinafter more fully explained.

A second reflector 11 is mounted in vertically spaced relation above the reflector 4, said reflector 11 being pivotally mounted as at 12 above the condensing element 3. The reflector 11 is arranged to intercept the rays C projected upwardly from the lighting element 2 past the rearward edge of the reflector 4 and through the recess 9 and to reflect said rays downwardly at a very slight angle whereby a beam of light is projected far in advance of the headlight to illuminate objects at a distance, the inclination being sufficient to avoid annoyance to persons observing the light. An adjusting screw 13 is pivotally connected to the reflector 11 through the top of the housing to permit the reflector to be adjusted to regulate the angle at which the rays C are projected.

The housing is preferably made rectangular in shape and the front of the housing 1 is closed by a transparent plate 14 adapted to permit the unobstructed passage of light therethrough. The plate 14 is preferably slidably mounted within grooves formed in the sides of the housing and normally retained by a member 16 pivotally mounted upon the top of the housing and normally held by springs 17 against the top of the plate 14. The member 16 is provided with an extension 18 arranged to match with the rim of the headlight housing and to be held closely against the front of the plate 14 to effectually exclude dirt and moisture from the housing.

In operation the lighting element is illuminated in the well known manner, light projected in all directions from the filament of the light. Of these rays a portion are projected forwardly directly through the plate 14. As these rays radiate in all directions a portion of the rays would normally follow an upward course such as to cause an annoying glare to persons observing the light from in front. The reflector 4 is inclined in the front of the lighting element in such a manner that such rays D are intercepted and deflected downwardly onto the ground immediately in front of the headlight, and the glare ordinarily resulting from these rays is thus avoided.

Of the rays that are projected from the lighting element onto the condensing element 3 and directed into a fan shaped beam as above described, the rays forming the lower half of the beam are projected directly forwardly onto the road ahead to give an area of relatively intense illumination on the road as above described, the remainder of such rays being deflected by the reflector 4 onto the road immediately in front of the headlight. These deflected rays cause the roadway to be efficiently lighted close to an automobile upon which the headlight is mounted and also cause an efficient lighting upon both sides of the road. This side lighting is particularly effective. The limited and uncertain illumination ordinarily obtained prevents a clear observation of the road and surrounding objects when making a turn particularly upon the side of the road toward which the turn is being made as the light is projected straight ahead of the automobile leaving the side toward which the automobile is turning in darkness. By my improved arrangement of reflectors however, a zone of high illumination is obtained directly in front of the automobile and upon both sides so that objects upon both sides of the roadway as well as objects directly on the road will be fully illuminated.

The direct rays from the lighting element which are intercepted and reflected by the reflector 11 are projected far ahead of the automobile so as to reveal objects at a distance without causing annoyance to approaching drivers.

From the above explanation it will be seen that the light from the lighting element is divided into a plurality of portions adapted to illuminate different zones in an efficient manner. Thus of the direct rays from the lighting elements a portion follows a normal forward course to illuminate the roadway in front of the headlight. A second portion of the direct rays are deflected downwardly to prevent glare and annoyance to approaching persons and to illuminate the road immediately in front of the automobile. A third portion of the direct rays is received and reflected by the reflector 11 to obtain distant illumination without causing glare.

The rays reflected by the element 3 are in turn divided into two separate and distinct portions, one portion serving to give an area of high illumination at a safe driving distance in front of the automobile while the second portion is deflected to light the road immediately in front of and at the sides of the automobile.

In this manner the light from the lighting element is distributed over a plurality of zones to obtain an efficient illumination of the road without causing any glare objectionable to the drivers of other automobiles.

Having thus described my invention what I claim as new and desire to secure by Letters Patent is,

1. An automobile headlight comprising a housing; a lighting element mounted within the back of the housing; a light condensing element mounted in back of the lighting element; a reflector mounted within the front of the housing across and in front of the condensing element to deflect rays of light from above the center of the lighting element downwardly directly in front of the headlight, said reflector having a recess formed in the rearward edge thereof to admit light upwardly therepast; and a second reflector mounted above the first mentioned reflector and the condenser to reflect light downwardly at a slight angle; and means for adjusting the reflectors to regulate the downward inclination of the reflected light.

2. An automobile headlight comprising a housing; a lighting element mounted within the back of the housing; an arcuate light condensing element substantially parabolic in cross section mounted within the housing in back of the lighting element to condense and project light in a wide fan shaped beam through the front of the housing; a reflector mounted within the front of the housing across the front of the condenser to deflect light rays from above the center of the lighting element downwardly directly in front of the headlight, said reflector having a recess formed in the back thereof opposite the lighting element to admit light upwardly therepast; and a second reflector mounted above the first mentioned reflector and the condensing element to reflect light downwardly at an angle less than the inclination of rays from the condensing element and the first reflector.

In witness whereof I hereunto set my signature.

ERIC ENGLEN.